United States Patent
Kawata

(10) Patent No.: US 7,506,209 B2
(45) Date of Patent: Mar. 17, 2009

(54) COMPUTER SHUTOFF CONDITION MONITORING METHOD, INFORMATION PROCESSING APPARATUS, PROGRAM AND COMPUTER READABLE INFORMATION RECORDING MEDIUM

(75) Inventor: Shohachi Kawata, Kawasaki (JP)

(73) Assignee: Fujitsu Limited, Kawasaki-Shi, Kanagawa (JP)

( * ) Notice: Subject to any disclaimer, the term of this patent is extended or adjusted under 35 U.S.C. 154(b) by 409 days.

(21) Appl. No.: 11/136,410

(22) Filed: May 25, 2005

(65) Prior Publication Data
US 2006/0179353 A1  Aug. 10, 2006

(30) Foreign Application Priority Data
Feb. 4, 2005 (JP) ............................... 2005-029553

(51) Int. Cl.
*G06F 11/00* (2006.01)
(52) U.S. Cl. ............................... 714/36; 714/23; 714/24
(58) Field of Classification Search .................. 714/36, 714/23, 24
See application file for complete search history.

(56) References Cited

U.S. PATENT DOCUMENTS

| | | | | |
|---|---|---|---|---|
| 6,230,286 B1 * | 5/2001 | Shapiro et al. | ................. | 714/23 |
| 6,314,532 B1 * | 11/2001 | Daudelin et al. | ............... | 714/38 |
| 6,381,694 B1 * | 4/2002 | Yen | ................................ | 713/2 |
| 6,510,488 B2 * | 1/2003 | Lasser | ......................... | 711/103 |
| 7,089,450 B2 * | 8/2006 | Anderson et al. | .............. | 714/15 |
| 7,131,026 B2 * | 10/2006 | Denninghoff et al. | ........... | 714/6 |
| 7,178,061 B2 * | 2/2007 | Aasheim et al. | ............... | 714/24 |
| 2003/0226056 A1 * | 12/2003 | Yip et al. | ........................ | 714/4 |
| 2004/0078680 A1 | 4/2004 | Hu et al. | | |
| 2007/0168739 A1 * | 7/2007 | Wang et al. | .................... | 714/36 |

FOREIGN PATENT DOCUMENTS

JP  2004-38931  2/2004

* cited by examiner

*Primary Examiner*—Marc Duncan
(74) *Attorney, Agent, or Firm*—Fujitsu Patent Center

(57) ABSTRACT

A shutoff condition monitoring method for a computer, includes the steps of: a) determining that an abnormal shutoff has occurred when the computer shuts off without passing through predetermined shutoff processing; b) counting the number of times of repetitive occurrences of the abnormal shutoff; and c) determining that predetermined recovery processing should be carried out on the computer when the number of times of repetitive occurrences of abnormal shutoff exceeds a predetermined value.

3 Claims, 7 Drawing Sheets

FIG.5A

```
################################
#SETTING AT THE TIME OF SHIPMENT

#RECOVERY FLAG = 0   ~S1
$Flag_Recovery = 0;

#ABNORMAL SHUTOFF COUNTER = 0   ~S2
$Counter_AbnormalShutdown = 0;

#ABNORMAL SHUTOFF DETERMINATION NUMBER = 3   ~S3
$Number_MustRecovery = 3;

#SHUTDOWN FLAG = 1;   ~S4
$Flag_NormalShutdown = 1;

exit;
#END OF SETTING AT THE TIME OF SHIPMENT

################################
UPON PC START UP if ($Flag_NormalShutdown ==1){   ~S11,S12
NORMAL SHUTOFF AT PREVIOUS TIME

#CLEAR ABNORMAL SHUTOFF COUNTER   ~S13,S14
if ($Counter_AbnormalShutdown != 0){
    $Counter_AbnormalShutdown = 0;
}

#CLEAR RECOVERY FLAG   ~S15,S16
if ($Flag_Recovery != 0){
    $Flag_Recovery = 0;
}

#SHUTDOWN FLAG = 0   ~S17
$Flag_NormalShutdown = 0;
```

```
exit;
#START UP OS
} else {
#ABNORMAL SHUTOFF AT PREVIOUS TIME  ~S21

#INCREMENT ABNORMAL SHUTOFF COUNTER BY 1  ~S22
$Counter_AbnormalShutdown++;

#TRY NORMAL STARTING UP WHEN ABNORMAL SHUTOFF IS LESS THAN DETERMINATION NUMBER  ~S23
if ($Counter_AbnormalShutdown < $Number_MustRecovery){
exit;
#START UP OS
}
if ($Flag_Recovery != 0){
#DETERMINE AS HARDWARE FAILURE WHEN ABNORMAL SHUTOFF OCCURS IMMEDIATELY AFTER RECOVERY  ~S28
print("STARTING UP CANNOT BE DONE NORMALLY.");
print("POSSIBILITY OF HARDWARE FAILURE.");
print("CALL SERVICE.");
halt;
} else {
#DETERMINE THAT RECOVERY IS REQUIRED  ~S25
print("STARTING UP CANNOT BE DONE NORMALLY.");
print("EXECUTE RECOVERY WITH REFERENCE TO MANUAL.");
halt;

#DO NOT STOP AND EXECUTE RECOVERY PROGRAM
}
exit;

###############################
#UPON PC SHUTDOWN  ~S20

#SHUTDOWN FLAG = 1
$Flag_NormalShutdown = 1;

exit;

###############################
#UPON EXECUTING RECOVERY  ~S26

#RECOVERY FLAG = 1
$Flag_Recovery = 1;
exit;
```

FIG.5B

COMPUTER SHUTOFF CONDITION MONITORING METHOD, INFORMATION PROCESSING APPARATUS, PROGRAM AND COMPUTER READABLE INFORMATION RECORDING MEDIUM

BACKGROUND OF THE INVENTION

1. Field of the Invention

The present invention relates to a computer shutoff condition monitoring method, an information processing apparatus, a program and a computer readable information recording medium, and, in particular, to a computer shutoff condition monitoring method, an information processing apparatus, a program and a computer readable information recording medium, for achieving a function of appropriately determining a timing to actually execute recovery processing.

2. Description of the Related Art

For example, causes resulting in such a situation that a computer does not operate normally may include, other than a failure in a hardware, a trouble in software such as that caused by erroneous operation of a user, a failure in an operating system, a failure in application software, or such.

It is a common manner that a personal computer is sold in a state in which an operating system, as well various applications, are previously installed, so that a user who purchases the personal computer can use them immediately. In such a case, the contents of an initial state of a hard disk device acting as a secondary storage device of the personal computer is recorded in an optical disk type information recording medium (i.e., a so-called 'recovery disk' or such) or a predetermined area of the hard disk so that so-called recovery processing can be achieved for restoring the initial state of the personal computer in terms of software obtained when it has been bought. With the use thereof, it is possible to restore the stored contents of the hard disk in the initial state. Such processing is called recovery processing.

Thanks to this function, even when a trouble such as that mentioned above occurs in software, it is possible to solve the problem by carrying out the recovery processing. In fact, by returning all of the operating system, various types of application software and so forth stored in the hard disk into the initial state which is one obtained at the time when the personal computer has been bought, at least any software-related problem occurring can be completely solved.

Japanese Laid-open Patent Application No. 2004-38931 discloses a method for implementing data backup and recovery in a computer hard disk, as described later.

SUMMARY OF THE INVENTION

In many case, when a situation occurs in which a personal computer does not operate normally, a user may call a supplier of the personal computer for a repair or a replacement of the product. In such a case, if a cause resulting in the problem is a trouble of software and this matter is found out by a service staff of the supplier at a time of visiting the user, the staff should carry out the above-mentioned recovery processing so as to solve the problem. However, if not, an actual hardware repair or a replacement of the product itself may be made, and thus, unnecessary costs may occur.

The present invention has been devised in consideration of the above-mentioned situation, and, an object of the present invention is to provide a system by which a timing at which recovery processing is actually required for a personal computer, a computer built-in type electric/electronic device or such is automatically detected, the recovery processing is automatically carried out if necessary, or a user is urged to initiate the recovery processing.

In order to achieve the object, according to the present invention, in a computer in which an application is operated after predetermined starting up processing is carried out, a case where the computer shuts down without passing through predetermined shutoff processing is detected as an abnormal shutoff event, the number of times of repetitive occurrences of such an abnormal shutoff event is counted, and, when the thus-obtained count value exceeds a predetermined value, it is determined that the time has come to carry out predetermined recovery processing on the computer.

In this configuration, it is possible to positively determine a timing at which recovery processing is required for a computer by a relatively simple configuration. Thereby, it is possible to effectively avoid an unnecessary increase of the cost caused by hardware replacement or such, and it is also possible to eliminate a work such as data backup processing, processing of re-installing various programs and so forth otherwise required accompanying the recovery processing which may not be actually required.

BRIEF DESCRIPTION OF THE DRAWINGS

Other objects and further features of the present invention will become more apparent from the following detailed description when read in conjunction with the accompanying drawings:

FIGS. 5A and 5B show an example of a program list of a shutoff condition monitoring program of the information processing apparatus according to the embodiment of the present invention;

DETAILED DESCRIPTION OF THE PREFERRED EMBODIMENTS

Figure 1:
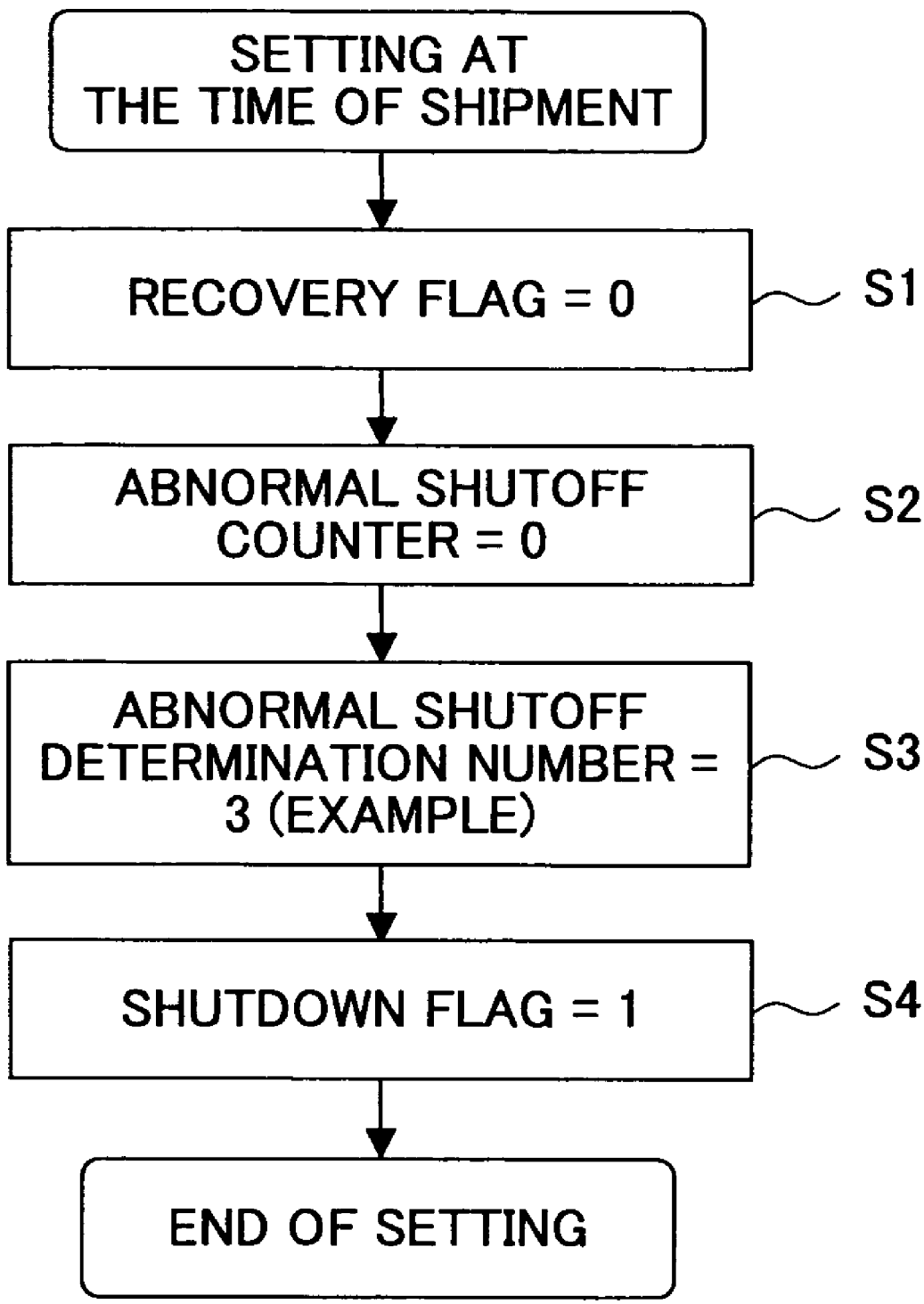
FIGS. 1 through 3 show operation flow charts of shutoff condition monitoring processing carried out by an information processing apparatus according to one embodiment of the present invention.

In many cases, software troubles of computers are those caused by problems concerning in an operating system or application software other than a BIOS (Basic Input Output System). Therefore, it is possible to positively detect a shutoff condition and store the same in a predetermined non-volatile memory, even when the operating system cannot shutoff normally due to such a problem and cannot carry out detection of the shutoff condition and storing the same in a predetermined non-volatile memory by itself.

Further, in many cases, it is possible to recover from a situation of software trouble by shutting down the computer by means of a predetermined shutdown function of the operating system, and after that, re-starting the same. Accordingly, even when a situation occurs in which it is not possible to normally shutoff the operating system as mentioned above, and therefore the computer should be shut off forcibly by means of pressing a power switch for a long duration or such occurs several times, it may not be appropriate to determine that a timing at which recovery processing is required has come only from such an event.

Therefore, according to the present invention, the necessity of recovery processing is determined from a count value of the number of times of repetitions of, i.e., successive occurrences of such an abnormal shutoff event as mentioned above, and thereby, unnecessary execution of recovery processing is avoided.

According to an embodiment of the present invention, a BIOS mounted in the computer is configured to have a function to determine, at a time of starting up of the computer, whether or not the operating system has shut down normally at a previous occasion of machine shutoff. Then, when it is determined that normal shutdown has not been carried out at the previous machine shutoff occasion and also such a situation has occurred successively, predetermined recovery processing is then executed, or a message urging a user to initiate the recovery processing is output (for example, a relevant message page is displayed on a display device of the computer).

When it is determined that normal shutdown still cannot be carried out even after the above-mentioned recovery processing has been thus carried out, the BIOS determines that a hardware failure has occurred, and outputs a message indicating this matter.

In order to actually make it possible to carry out the above-mentioned determination, i.e., the determination that a situation that normal shutdown cannot be carried out occurs successively, and the determination that normal shutdown still cannot be carried out even after execution of the recovery processing, an operation processing part and a storage part which do not depend on the operating system are required. This can be made possible by utilizing a function of the well-known BIOS and a non-volatile storage area (for example, an EEPROM) in which stored contents are held even after the power supply is turned off in the computer.

The above-mentioned 'shutdown' or 'to shut down' means operation which is normally carried out by an operating system of a personal computer which is provided with a so-called 'ACPI (advanced configuration and power interface)' function. That is, 'shutdown' means operation that a computer safely shuts off according to a predetermined shutdown procedure in response to predetermined operation made by a user on the computer. The predetermined operation made by a user on the computer to initiate the 'shutdown' may be operation of pressing of a menu button named 'shutdown' in a menu page provided by the operating system, which operation is operation to automatically shut off the personal computer after the completion of a user's regular usage of the personal computer, for automatically recording current set values of application and so forth, and then, finally turning off the power of the personal computer automatically by a function of the operating system.

It is noted that a recent type of a personal computer has a function, different from the above-mentioned, by which such shutdown processing is initiated merely as a result of a power switch being lightly pressed.

The operation of 'shutdown' depends on operation of an operating system. Accordingly, when a trouble occurs in the operating system itself due to some cause (specific examples of which are described later), the operation of 'shutdown' may not be carried out properly.

In such a case, the user may forcibly terminate operation of the computer by a step of pressing a power switch, as a hardware, or such, for turning off the power of the computer finally. However, when such forcible shutoff operation is carried out, the above-mentioned predetermined shutdown processing including storage of various set values which are set during the operation of the computer, or such, may not be carried out. As a result, a problem may occur in which necessary data is lost, or such. Therefore, generally speaking, such forcible shutoff processing should not be carried out as far as possible.

However, when the computer is re-started after being shut off by means of such forcible shutoff operation, a relevant software problem may be solved, as a result of memories accompanying the CPU being reset by a function of the operating system so that a cause which obstructs the predetermined shutdown operation is removed. In this view point, it can be said that a predetermined series of processing from forcible shutoff through re-starting is effective to recover from a certain type of trouble.

Such a way of removing a trouble by 're-starting' may be effective, not only for the above-mentioned case where normal shutdown operation cannot be carried out, but also, for a case where a relevant trouble is not so serious one that normal shutdown operation can be carried out by the operating system. This is a case where a relevant problem is within a driver accompanying an application or a hardware, and the operating system itself has no problem.

As mentioned above, recovery processing returns a computer to an initial state obtained when a product has been purchased, in terms of software. Therefore, all the data which has been produced and stored in a hard disk after the computer has been purchased is completely erased. Accordingly, backup processing should be carried out to save necessary data in a separate recording medium such as a CD, before actually carrying out recovery processing. Then, after the completion of the recovery processing, the data thus saved should be again stored in the hard disk as well known.

Thus, recovery processing requires a certain amount of a work load or a manpower as well as working hours. Accordingly, this should be carried out only for a case where it is actually required. However, as mentioned above, recovery processing returns a computer into a state obtained when a product has been purchased in terms of software, and thus, all possible software related problems can be solved. In this view point, this is a very advantageous procedure to remove a software related trouble.

For example, Japanese Laid-open Patent Application No. 2004-38931, mentioned above, discloses a method of carrying out recovery processing of a computer automatically in response to user's input of a starting-up instruction. However, in this method, a user himself or herself should determine a timing at which the recovery processing is actually required. As mentioned above, the recovery processing is very advantageous to solve a software related problem. However, also as mentioned above, a certain amount of a work load is required, i.e., data backup processing, re-storing processing after the recovery processing and so forth. Even if such processing accompanying the recovery processing is carried out automatically in the computer, regular operation of a user should be more or less disturbed.

Therefore, as mentioned above, it is common that a user does not wish to actually carry out recovery processing as far as possible. Further, as mentioned above, even without carrying out recovery processing, a relevant trouble may be removed only by a step of carrying out forcible shutoff and re-starting operation. Therefore, it is not necessarily easy to determine the timing at which recovery processing should be actually carried out.

According to the embodiment of the present invention, as mentioned above, the timing for recovery processing is determined from the count number of times of successive occurrences of a situation in which normal shutdown operation cannot be carried out. The count number is reset in a case where: even once normal shutdown cannot be carried out, and then forcible shutoff operation is carried out as mentioned above so that a computer is forcibly shut off; normal starting up of the computer can be carried out after that, and also, normal shutdown operation becomes available at this time. As mentioned above, a certain type of software related trouble can be solved even in such a way. According to the embodiment of the present invention, unnecessary execution of recovery processing can be avoided particularly in such a case, and thus, it is possible to avoid unnecessary disturbance of user's regular operation.

Further, according to the embodiment of the present invention, in a case where normal shutdown operation still cannot be carried out even after recovery processing is carried out, it is determined that a series type of trouble occurs such that this cannot be solved even by means of recovery processing. This is because, generally speaking, such a trouble which cannot be solved even by recovery processing may be such a serious type of trouble that actual repair or replacement of the product by a relevant supplier is required.

Thus, in the computer shutoff condition monitoring method according to the embodiment of the present invention, stepwise processes are applied, i.e., (i) trying normal shutdown operation; (ii) carrying out re-starting after forcible shutoff operation when the trial for normal shutdown has not be succeeded in; (iii) carrying out recovery processing when the situation of the item (ii) occurs successively; and (iv) urging a user to ask a supplier to repair or replace the product when the problem is not solved even by means of the recovery processing. As a result, it is possible to provide a system by which an appropriate measure is always applied depending on a particular actual seriousness degree of a relevant trouble.

In many cases, software troubles are those concerning an operating system (including various types of application software operating on the operating system). Even in such a case, a BIOS which can operate independently from the operating system, can operate properly. Therefore, according to the computer shutoff condition monitoring method according to the embodiment of the present invention, the above-mentioned step of determining a timing to actually execute recovery processing in the above-mentioned item (iii) and the step of determining in the above-mentioned item (iv) that an actual repair or replacement by the supplier should be asked, are executed by the BIOS. Further, a non-volatile memory device is applied for holding necessary data, which is kept therein the even after the power supply in the computer is turned off. As a result, it becomes possible to effectively solve software troubles in many cases.

The embodiment of the present invention is now described in further detail.

Figure 2:
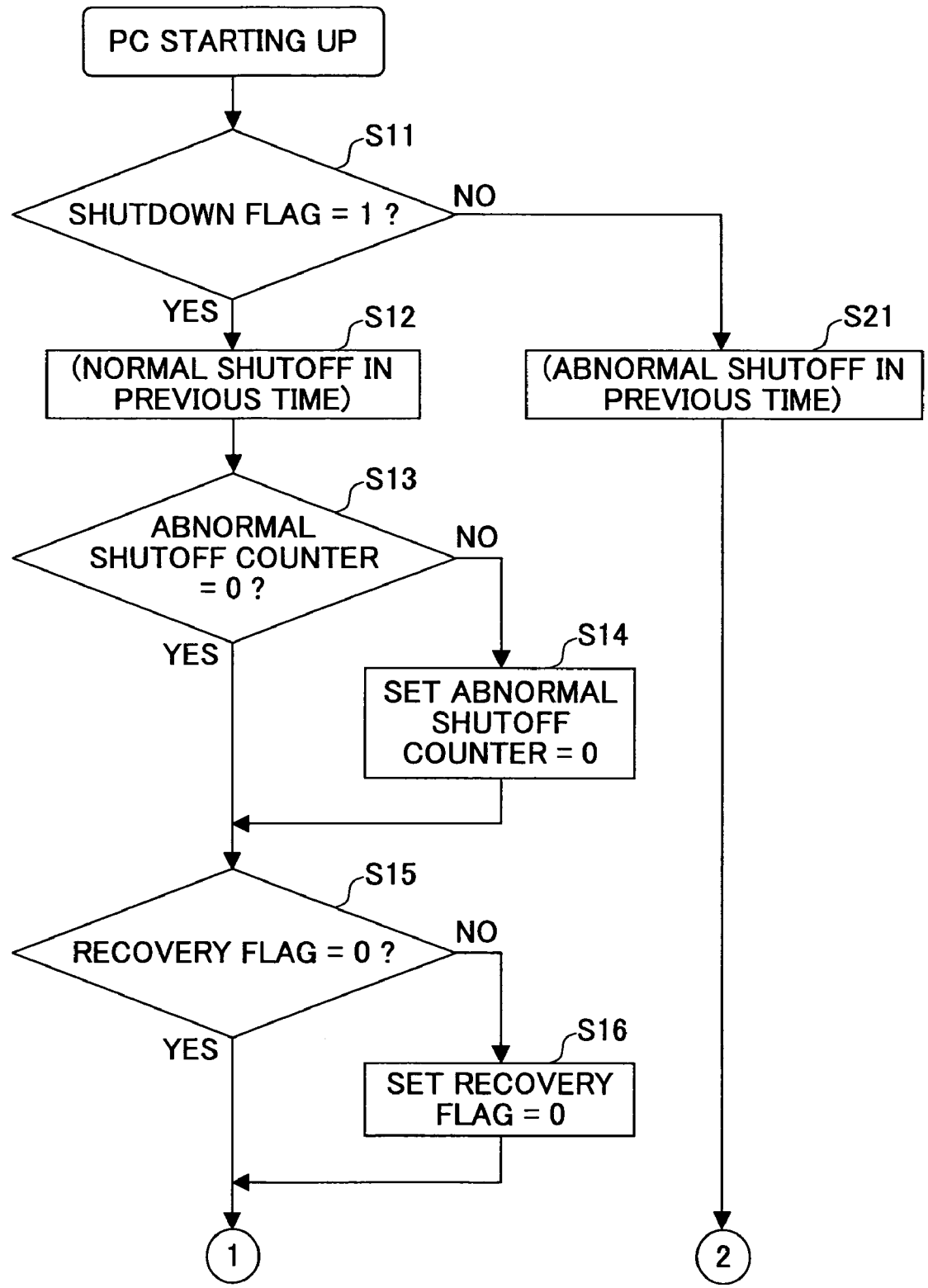
Figure 3:
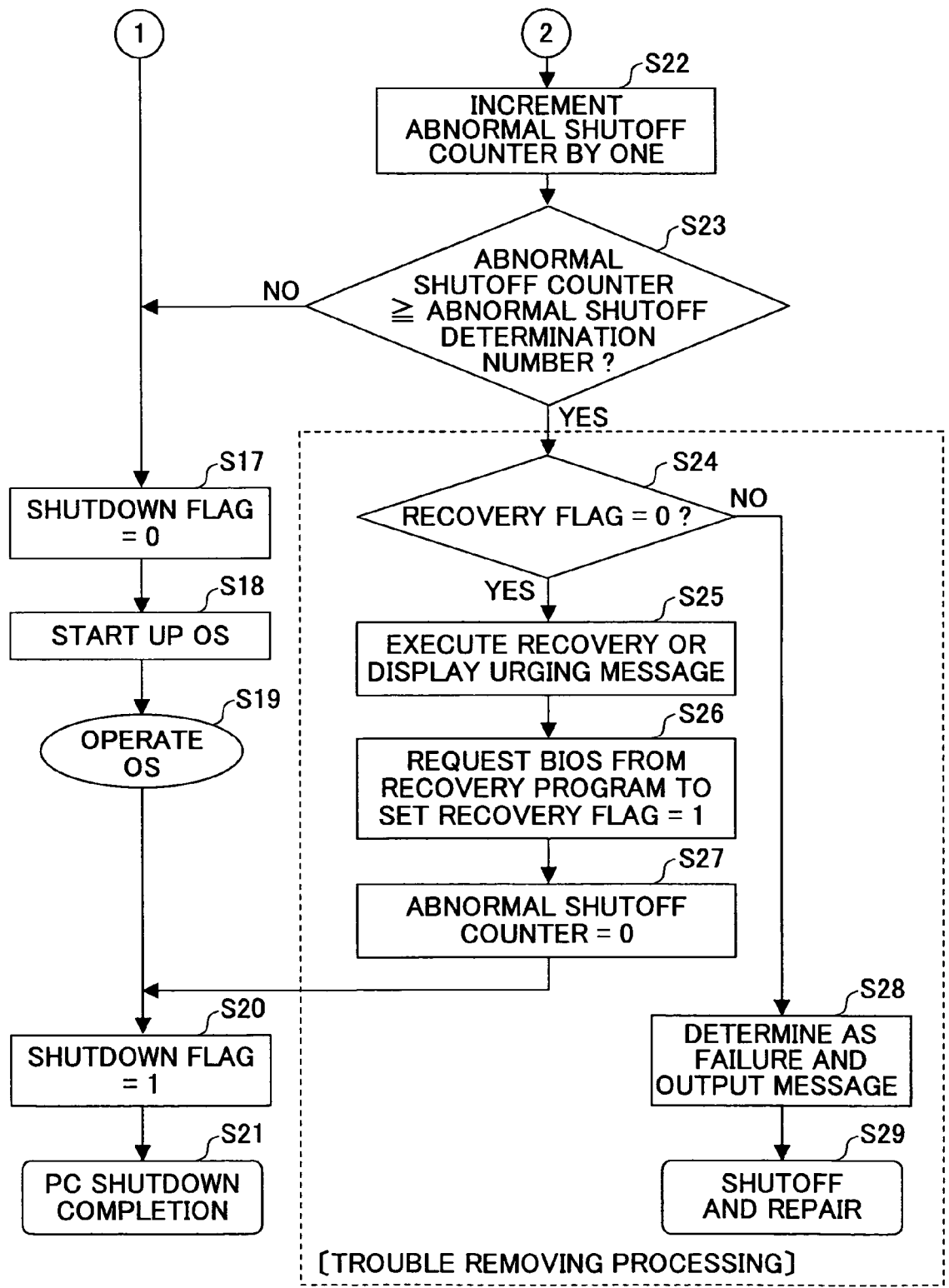

FIGS. 1 through 3 show flow charts of shutoff condition monitoring processing carried out by execution of a program built-in in a BIOS (referred to as a 'shutoff condition monitoring program', hereinafter) by a personal computer acting as an information processing apparatus according to the embodiment of the present invention. FIGS. 5A and 5B show an example of a program list of the above-mentioned shutoff condition monitoring program. The step numerals shown in FIGS. 5A and 5B correspond to those of FIGS. 1 through 3, and correspond to instructions for executing relevant operation.

As a result of this shutoff condition monitoring program being built-in in the BIOS, this program can be executed by a CPU of the personal computer independently from an operating system also mounted in the personal computer. Thereby, even when the operating system enters a situation in which the operating system cannot operate normally due to some cause, the shutoff condition monitoring program can be executed properly. Accordingly, even a trouble concerning the operating system occurs, the shutoff condition monitoring system according to the embodiment of the present invention can properly function.

Processing shown in FIG. 1 is initializing processing of a processing algorithm of the above-mentioned shutoff condition monitoring program, and is executed at a time of a shipment of the product. In Step S1, a 'recovery flag' is initialized to zero. The recovery flag is a flag in which "1" is set when recovery processing is carried out in a previous operation occasion.

In Step S2, a count value of an 'abnormal shutoff counter' is initialized to zero. The abnormal shutoff counter is a counter for counting the number of times of successive occurrence of an abnormal shutoff event. An 'abnormal shutoff event' means a case where the personal computer shuts off by operation other than the above-mentioned regular shutdown operation in a predetermined procedure carried out by the operating system. Specifically, the above-mentioned forcible shutoff event corresponds to the abnormal shutoff event, for example.

In Step S3, an 'abnormal shutoff determination number' which is applied as a criterion with respect to the above-mentioned count value of the abnormal shutoff counter is set. As one example, "3" is set. That is, it is determined in this case that actual execution of recovery processing is required when the number of times of successive shutoff events of the personal computer by operation other than the regular shutdown operation reaches "3".

In Step S4, a 'shutdown flag' is initialized to "1". The shutdown flag is a flag in which "1" is set when a condition in a previous shutoff occasion of the personal computer corresponds to the regular shutdown condition.

Figure 6:
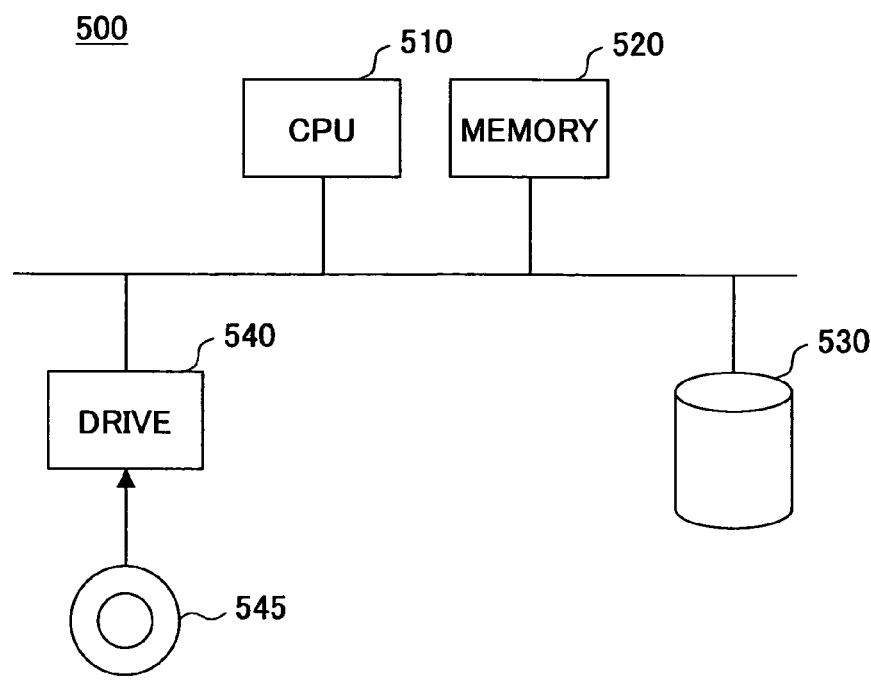
FIG. 6 shows a block diagram illustrating an example of a configuration of the information processing apparatus according to the embodiment of the present invention.

Respective set values of the above-mentioned recovery flag, abnormal shutoff flag, abnormal shutoff determination number and shutdown flag are written, by a function of the shutoff condition monitoring program built-in in the BIOS, in a non-volatile memory or a non-volatile storage area (a memory or a storage area included in a memory 520 shown in FIG. 6) in which storage contents are kept even when the power of the personal computer is turned off.

As a result being written in the non-volatile memory or such, the respective set values of the recovery flag, abnormal shutoff flag, abnormal shutoff determination number and shutdown flag are held without regard to operation/shutoff state of the personal computer, and thereby, the shutoff condition monitoring processing according to the embodiment of the present invention described later can always function.

FIGS. 2 and 3 show an execution part of the above-mentioned processing algorithm of the shutoff condition monitoring processing.

First, upon starting up of the personal computer, the BIOS determines whether or not the shutdown flag has a value of "1" in Step S11. That is, it is determined whether or not a signal is received from the operating system indicating execution of shutdown operation carried out by the ACPI function at a previous operation occasion, that is, the computer has shut off normally in the previous operation occasion. When it is thus determined that the computer has shut off normally in the previous operation occasion (Step S12), the abnormal shutoff counter is reset to zero (Step S13). In this case, when the abnormal shutoff counter already has the value of zero (Yes), Step S15 is then executed without carrying out any operation in Step S13.

Then, in Step S15, the BIOS resets the recovery flag into zero (Step S16). In this case, when the recovery flag already has the value of zero (Yes), Step S17 is then executed without carrying out any operation in Step S15.

On the other hand, when the shutdown flag has a value other then "1" in Step S11 (No), that is, when abnormal shutoff was carried out in the previous operation occasion (Step S21), the abnormal shutoff counter is incremented by "1" (Step S22). Then, in Step S23, the value of the abnormal shutoff counter is compared with the above-mentioned abnormal shutoff determination number.

Then, when the comparison result is that the count value of the abnormal shutoff counter is equal to or more than the abnormal shutoff determination number, that is, equal to or more than "3" in this example (Yes), it is determined that the computer has entered a condition in which normal starting up (normal shutoff) cannot be carried out. Then, in Step S24, the value of the recovery flag is referred to. Then, when the recovery flag has a value of "1" (No of Step S24), which means that recovery processing has been already carried out in the previous operation occasion, it is determined that a hardware failure has occurred. Then, Step S28 is executed. In Step S28, a message of "call a supplier and ask a repair" or such is output. Then, in Step S29, shutoff of the computer is carried out.

When the referring result in Step S24 is Yes, which means that no recovery processing has been carried out in the previous operation occasion, recovery processing is actually carried out or a message urging the user to initiate recovery processing is output at this time (Steps S25 and S26). After the completion of the recovery processing, "1" is set in the recovery flag which means that recovery processing has been thus carried out. The recovery processing is described later.

Then, in Step S27, the abnormal shutoff counter is reset to zero. Then in Step S20, "1" is set in the shutdown flag. Steps S24 through S29 correspond to 'trouble removing processing".

On the other hand, in Step S17, "0" is once set in the shutdown flag. This set value may be then retuned to "1" in Step S20. However, this is the case where the computer has been normally shut down by the operating system. On the other hand, Step S20 is not carried out when the operating system cannot carry out normal shutdown operation due to some cause such as a software trouble occurring during operation. In this case, the shutdown flag is kept unchanged from "0", while the computer is thus shut off. That is, a record has been thus made indicating that normal shutdown could not be carried out.

Then, in Step S18, the operating system starts up, and then, after that, regular operation is carried out (Step S19). That is, the user uses the personal computer, and carries out regular work (for example, produces a document by a function of a word-processor application). Then, after the normal work is finished, and when the user carries out predetermined shutdown operation on the computer, that is, presses a shutdown button displayed on a display device of the personal computer, or presses the power switch lightly, the BIOS returns the shutdown flag into "1" (Step S20). Then, in Step S21, the personal computer automatically shuts off safely according to the regular software-driven shutoff procedure (shutdown).

Figure 4:
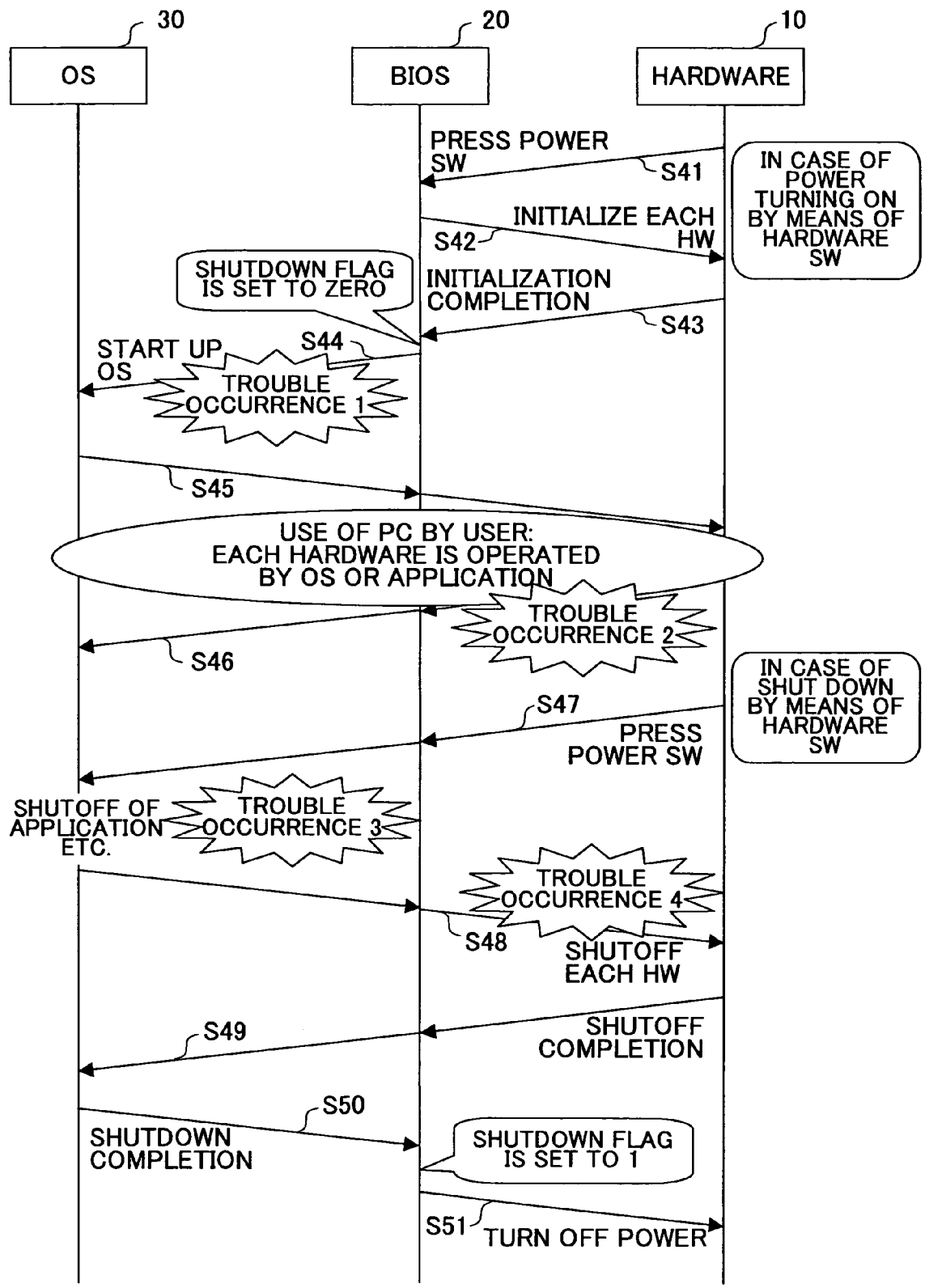
FIG. 4 shows a sequence diagram illustrating operation of the information processing apparatus according to the embodiment of the present invention from starting up operation through shutoff.

FIG. 4 shows a sequence diagram illustrating a series of processing of Steps S17 through S21 of FIG. 3. This shows a sequence of signal transmission carried out from starting up of the computer through shutoff. As shown in FIG. 4, in the personal computer according to the embodiment of the present invention, the BIOS 20 functions to carry out signal transmission between a hardware 10 providing basic input/output functions including the power switch and the operating system 30.

In Step S41, when the power switch of the personal computer is pressed, the BIOS 20 initializes respective hardware devices via relevant driver software in Step S42. After the completion of initialization, a completion notification is sent to the BIOS 20 from the hardware 10 (Step S43). The BIOS 20 receiving it starts up the operating system 30 (Step S44). The above-mentioned Step S17 of FIG. 3 of operation of setting the shutdown flag to "0" is a step carried out by the BIOS 20 in response to Step S43.

After the operation system 30 is thus started up, the user can carry out normal work with the use of the personal computer (as mentioned above, for example, produces a document by the function of the word-processor application) as mentioned above. As a result, the user can, if necessary, operates each hardware device such as a printer via the relevant driver software through the operating system 30 and the BIOS 20 (Steps S45 and S46).

After the completion of the regular work, the user may carry out operation to shut off the personal computer (step S47). It is assumed that the personal computer in the embodiment has a function such that, when the power switch is lightly pressed, the predetermined shutdown operation is automatically initiated, but, on the other hand, when the power switch is pressed for a long duration, the above-mentioned forcible shutoff operation is automatically initiated. Therefore, in this case, the user may lightly press the power switch so as to initiate the above-mentioned regular shutdown operation.

As a result, the BIOS 20 transmits a signal for initiating the shutdown to the operating system 30, which then receives the signal and finishes operation of application software having been started up by the user for the purpose of the above-mentioned regular work. After that, the BIOS 20 finishes operation of hardware such as the printer (Step S48).

After the operation to shut off the hardware is thus completed, a relevant notification is sent to the operating system 30 via the BIOS 20. The operating system 30 receiving this notification completes the shutdown processing (Step S50). The BIOS 20 then receiving a relevant notification from the operating system carries out operation of returning the shutdown flag to "1" in Step S20 of FIG. 3. After that, the BIOS 20 carries out operation to turn off the power of the personal computer finally (Step S51).

With reference to FIG. 4, specific examples of the above-mentioned 'situations from which the operating system cannot carry out normal shutdown operation', directed to by the shutoff condition monitoring processing according to the embodiment of the present invention are described below in detail.

First, in FIG. 4, examples of troubles which may occur at a position 'trouble occurrence 1' shown (at a time of starting up the operating system) are as follows (a possible cause of each trouble is shown enclosed by parenthesis):

occurrence of an alarm that 'OS not found' (loss of a bootstrap code or such);

so-called blue back error display (loss of a file required for starting up the operating system, or such);

error display immediately after starting up of the operating system (a problem in resident application, or such); and re-boot (introduction of an erroneous driver, or such).

Examples of troubles which may occur in 'trouble occurrence 2' (at a time of execution of an application after the starting up of the operating system) are as follows:

application error (execution of defective application or such);

hung up (operation mismatch between applications or such); and blue back error display (execution of erroneous driver or such).

Examples of troubles which may occur in 'trouble occurrence 3' (at a time of shutoff of the operating system or application) is as follows:

shutoff of application not possible (defectiveness in the application);

error at a time of shutoff of application (ditto); and hung up (defectiveness in a driver or such).

Examples of troubles which may occur in 'trouble occurrence 4' (at a time of hardware shutoff) are as follows:

shutoff of the operating system not possible (defectiveness in the hardware);

hung up (ditto); and blue back error display (ditto).

The above-mentioned case of 'trouble occurrence 4' may be a case of a hardware failure with a high possibility. However, in the other cases ('trouble occurrence 1' 'trouble occurrence 2'and 'trouble occurrence 3'), it can be said that the relevant trouble may be solved by removing a software-related factor with a sufficient possibility. That is, the trouble may be solved by means of 'shutdown and re-stating processing' or 'recovery processing'.

Various recovery ways by means of software may be assumed. However, execution of recovery processing is a positive method as mentioned above.

When a problem occurs at any point from among the above-mentioned 'trouble occurrence 1'through 'trouble occurrence 4', and a user carries out operation to forcibly turn off the power (for example, presses the power switch for a long duration), the power is turned off while the steps of processing, otherwise being carried out subsequently to this point, is not actually carried out. As a result, the operation of returning the shutdown flag to "1" which is the last step (Step S20) of the shutdown processing, is not carried out either. As a result, it is possible to determine, at a time of starting up in a subsequent operation occasion, that the computer has shut off, not through normal shutdown processing, by referring to the shutdown flag (Step S11 of FIG. 2).

Next, recovery processing in Step S25 of FIG. 3 is described in detail.

Recovery processing is processing for returning the stored contents of the hard disk (including data recording current states of each software) to those obtained when the relevant personal computer has been purchased. Specifically, all the stored contents of the hard disk are once deleted, data the same as that obtained when the product has been purchased is read out from a recovery disk (CD-ROM or such) attached to the product, and then, the thus-read data is stored in the hard disk again. The data thus read out from the recovery disk includes the operating system program, various application programs, other necessary data and so forth, and is referred to as 'recovery data', hereinafter.

Various settings and so forth existing at the time are all reset when recovery processing is carried out. Accordingly, a trouble for which it is difficult to determine a cause thereof and to seek a method to recover therefrom, may be easily solved. Various ways of dealing with various problems are mentioned in an operation manual attached to the product or an online-type operation manual obtainable via a communication network. However, when it is not possible to solve a relevant problem even referring to the manual or such, it may be positively solved by means of recovery processing, by which all the software-related matters are returned to the original as mentioned above.

Both the recovery data, that is, information the same as that stored in the hard disk when the product has been purchased, and a program required for actually storing the recovery data in the hard disk (referred to as a 'recovery program' hereinafter), are stored in an optical disk separately provided (recovery disk) or the hard disk itself. With the use thereof, recovery processing can be carried out also with the use of a well-known boot function of the BIOS.

In the case of the optical disk, the optical disk is set in a relevant drive of the computer, booting is carried out from the optical disk by means of the boot function of the BIOS, the recovery program stored in the optical disk is executed, and thus, the original data is restored. Thanks of a common function of the BIOS, the above-mentioned recovery operation can be carried out as a result of the recovery program being started up from the optical disk even if the operating system has a trouble and thus it does not function properly. Specifically, the BIOS 20 shown in FIG. 4 may be previously written in a ROM included in the memory 520, described later with reference to FIG. 6, and thereby, such a function of recovery processing can be positively achieved.

FIG. 6 shows an example of a hardware configuration of the personal computer in the embodiment of the present invention.

As shown in FIG. 6, the personal computer 500 in the embodiment of the present invention includes a CPU 510, a memory 520 applicable as a temporary storage area or a work area for the CPU 510, a hard disk device 530 as a secondary storage and a drive 540 for a carriable information recording medium 545 such as a CD-ROM.

The shutoff condition monitoring processing carried out by the personal computer in the embodiment of the present invention illustrated with reference to FIGS. 1 through 3 is carried out by the function of the BIOS 20 as mentioned above as a result of the CPU 510 actually executing the function. Actually, for example, the shutoff condition monitoring program may be previously stored in the carriable information recording medium 545 for example, be read by the CPU 510 through the drive 540, then be installed in the memory 520, be executed by the CPU, and thus, the shutoff condition monitoring processing may be carried out.

Application of the present invention is not limited to application to the personal computer as described above. Other than such a personal computer, the present invention may also be applied to a common electric/electronic device applying a computer in a building-in manner.

Figure 7:
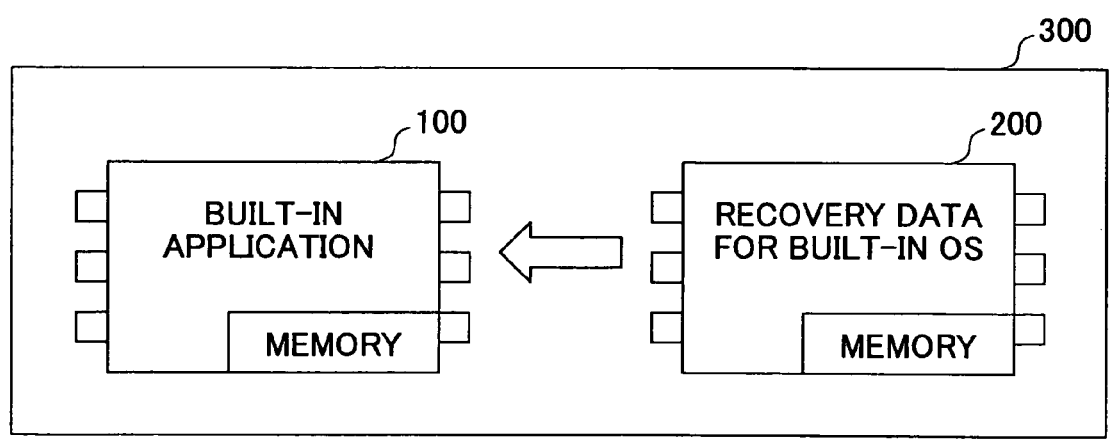
FIG. 7 shows a block diagram of an embodiment in which the present invention is applied to an electric/electronic device having a built-in operating system.

FIG. 7 shows an example as another embodiment of the present invention in which the present invention is applied to a home electric/electronic device, a cellular phone, or such, other than a personal computer.

It is a common way to separately attach to a product a recording medium (recovery disk) in which the recovery data and the recovery program are stored in a case where the present invention is applied to a personal computer as mentioned above. However, in a case where the present invention is applied to a home electric/electronic device, a cellular phone or such, other than a personal computer as mentioned above, the way to carry out recovery processing from such a carriable information recording medium, attached separately, may be hardly put into a practical use.

Recovery processing is to restore data, and thus, may be achieved even without necessarily the use of such a separate carriable information recording medium as long as necessary data is kept in a separate memory or such. The present invention should not especially be limited to a recording medium storing the recovery data. A similar system may also be realized even in an electric/electronic device in which a computer is built in, in a form of a hardware in which an operating system is built in, as described below.

In the example of FIG. 7, a home electric/electronic device or cellular phone 300 has a configuration such that an operating system and application software, necessary to carry out its original function, are mounted in a memory 100 in a form of firmware or such. Similarly, recovery data and a recovery program, for actually mounting the recovery data to the memory 100 at a time of recover processing, are mounted in a memory 200 in a form of firmware or such. In this case, the above-mentioned shutoff condition monitoring program should be written in any one of the memories 100 and 200.

Then when a situation, in which normal shutoff (that is, shutdown) by means of the operating system stored in the memory 100 cannot be carried out, occurs repetitively, this event is detected by means of the function of the shutoff condition monitoring program. As a result, by means of the function of the recovery program stored in the memory 200, or as a result of being initiated by a user's operation, the recovery processing is carried out with the use of the recovery data also stored in the memory 200. That is, operation to restore the original state, obtained when the product has been purchased, of the operating system and the application software in the memory, is carried out.

Thus, it is possible to achieve a user-friendly configuration of the computer-built-in type electric/electronic device by which the recovery processing is carried out at an appropriate timing for the operation system and application software mounted in the memory 100, and thus, the function of the computer can be ensured.

The above-mentioned term 'shutdown flag' corresponds to 'normal shutoff information', and 'recovery flag' corresponds to 'recovery related information'.

The present invention may have a configuration described in each of the following items:

(1) A shutoff condition monitoring method for a computer, comprising the steps of:

a) determining that an abnormal shutoff has occurred when the computer shuts off without carrying out predetermined shutdown processing;

b) counting the number of times of repetitive occurrences of the abnormal shutoff; and c) determining that predetermined recovery processing should be carried out on the computer when the number of times of repetitive occurrences of the abnormal shutoff exceeds a predetermined value.

(2) A shutoff condition monitoring method for determining a timing at which predetermined recovery processing should be carried out on a computer by monitoring a shutoff condition of the computer, comprising the steps of:

a) determining, when starting up the computer, whether or not predetermined normal shutoff information is set;

b) carrying out the step b1) when it is determined in said step a) that the predetermined normal shutoff information is set:

b1) resetting the predetermined normal shutoff information, and carrying out starting up of the computer; and c) setting the predetermined normal shutoff information when the computer, thus once having started up, then shuts off normally.

(3) The shutoff condition monitoring method as described in the above-mentioned item (2), further comprising the steps of:

d) increasing a count value of an abnormal shutoff counter when it is determined in said step a) that the normal shutoff information is not set;

e) comparing the count value of the abnormal shutoff counter with a reference value; and f) carrying out predetermined trouble removing processing when the count value of the abnormal shutoff counter exceeds the reference value in said step e).

(4) The shutoff condition monitoring method as described in the above-mentioned item (3), wherein:

said predetermined trouble removing processing comprises the steps of:

g) determining whether or not predetermined recovery related information is set; and h) carrying out the step i) when it is determined in said step g) that the predetermined recovery related information is set, but carrying out the steps j1) and j2) when it is determined in said step g) that the predetermined recovery related information is not set:

i) outputting a fault message;

j1) carrying out predetermined recovery processing; and j2) setting the recovery related information and resetting the abnormal shutoff counter.

(5) The shutoff condition monitoring method as described in the above-mentioned item (4), further comprising the step of:

k) resetting the abnormal shutoff counter, the recovery related information and the normal shutoff information, when it is determined in said step a) that the normal shutoff information is set.

(6) A shutoff condition monitoring method comprising the steps of:

a) determining, when starting up a computer, whether or not normal shutoff information is set in the computer;

b) carrying out the step b1) when it is determined in said step a) that the normal shutoff information is set, but carrying out the step b2) when it is determined in said step a) that the normal shutoff information is not set:

b1) increasing a count value of an abnormal shutoff counter;

b2) resetting the count value of the abnormal shutoff counter, a recovery flag and the normal shutoff information in the computer, and starting up the computer;

c) setting the normal shutoff information when the computer shuts off normally;

d) comparing the count value of the abnormal shutoff counter with a reference value after the count value of the abnormal shutoff counter is increased in said step b1);

e) determining whether or not recovery related information is set, when the count value is larger than the reference value in said step d); and f) carrying out the step f1) when it is determined in said step e) that the recovery related information is set, but carrying out the step f2) when it is determined in said step e) that the recovery related information is not set:

f1) determining that a device fault occurs in the computer;

f2) carrying out predetermined recovery processing on the computer, setting the recovery related information, resetting the count value of the abnormal shutoff counter and setting the normal shutoff information.

(7) A computer comprising:

a part determining that an abnormal shutoff has occurred when the computer shuts off without carrying out predetermined shutdown processing;

a part counting the number of times of repetitive occurrences of the abnormal shutoff; and a part determining that predetermined recovery processing should be carried out on the computer when the number of times of repetitive occurrences of the abnormal shutoff exceeds a predetermined value.

(8) A computer having a function of determining a timing at which predetermined recovery processing should be carried out by monitoring a shutoff condition of the computer, comprising:

a part determining, when starting up the computer, whether or not predetermined normal shutoff information is set;

a part carrying out, when it is determined that the predetermined normal shutoff information is set, resetting the predetermined normal shutoff information, and carrying out starting up of the computer; and a part setting the predetermined normal shutoff information when the computer, thus once having started up, then shuts off normally.

(9) The computer as described in the above-mentioned item (8), further comprising:

a part increasing a count value of an abnormal shutoff counter when it is determined that the normal shutoff information is not set;

a part comparing the count value of the abnormal shutoff counter with a reference value; and a part carrying out predetermined trouble removing processing when the count value of the abnormal shutoff counter exceeds the reference value.

(10) The computer as described in the above-mentioned item (9), wherein:

said predetermined trouble removing processing comprises the steps of:

a) determining whether or not predetermined recovery related information is set; and b) carrying out the step c) when it is determined in said step a) that the predetermined recovery related information is set, but carrying out the steps d1) and d2) when it is determined in said step a) that the predetermined recovery related information is not set:

c) outputting a fault message;

d1) carrying out predetermined recovery processing; and d2) setting the recovery related information and resetting the abnormal shutoff counter.

(11) The computer as described in the above-mentioned item (8), further comprising:

a part resetting the abnormal shutoff counter, the recovery related information and the normal shutoff information, when it is determined, upon starting up the computer, that the normal shutoff information is set.

(12) A program comprising instructions for causing a computer to act as:

a part determining that an abnormal shutoff has occurred when the computer shuts off without carrying out predetermined shutdown processing;

a part counting the number of times of repetitive occurrences of the abnormal shutoff; and a part determining that predetermined recovery processing should be carried out on the computer when the number of times of repetitive occurrences of the abnormal shutoff exceeds a predetermined value.

(13) A program for causing a computer to execute a function of determining a timing at which predetermined recovery processing should be carried out by monitoring a shutoff condition of the computer, comprising instructions for causing the computer to act as:

a part determining, when starting up the computer, whether or not predetermined normal shutoff information is set;

a part carrying out, when it is determined that the predetermined normal shutoff information is set, resetting the predetermined normal shutoff information, and carrying out starting up of the computer;

a part setting the predetermined normal shutoff information when the computer, thus once having started up, then shuts off normally.

(14) The program as described in the above-mentioned item (13), further comprising instructions for causing the computer to act as:

a part increasing a count value of an abnormal shutoff counter when it is determined that the normal shutoff information is not set;

a part comparing the count value of the abnormal shutoff counter with a reference value; and a part carrying out predetermined trouble removing processing when the count value of the abnormal shutoff counter exceeds the reference value.

(15) The program as described in the above-mentioned item (14), wherein:

said predetermined trouble removing processing comprises the steps of:

a) determining whether or not predetermined recovery related information is set; and b) carrying out the step c) when it is determined in said step a) that the predetermined recovery related information is set, but carrying out the steps d1) and d2) when it is determined in said step a) that the predetermined recovery related information is not set:

c) outputting a fault message;

d1) carrying out predetermined recovery processing; and d2) setting the recovery related information and resetting the abnormal shutoff counter.

(16) The program as described in the above-mentioned item (15), further comprising instructions for causing the computer to act as:

a part resetting the abnormal shutoff counter, the recovery related information and the normal shutoff information, when it is determined, upon starting up of the computer, that the normal shutoff information is set.

(17) A program comprising instructions for causing a computer to execute the steps of:

a) determining, when starting up a computer, whether or not normal shutoff information is set in the computer;

b) carrying out the step b1) when it is determined in said step a) that the normal shutoff information is set, but carrying out the step b2) when it is determined in said step a) that the normal shutoff information is not set:

b1) increasing a count value of an abnormal shutoff counter;

b2) resetting the count value of the abnormal shutoff counter, a recovery flag and the normal shutoff information in the computer, and starting up the computer;

c) setting the normal shutoff information when the computer shuts off normally;

d) comparing the count value of the abnormal shutoff counter with a reference value after the count value of the abnormal shutoff counter is increased in said step b1);

e) determining whether or not recovery related information is set, when the count value is larger than the reference value in said step d); and f) carrying out the step f1) when it is determined in said step e) that the recovery related information is set, but carrying out the step f2) when it is determined in said step e) that the recovery related information is not set:

f1) determining that a device fault occurs in the computer;

f2) carrying out predetermined recovery processing on the computer, setting the recovery related information, resetting the count value of the abnormal shutoff counter and setting the normal shutoff information.

(18) A computer readable information recording medium storing therein a program described in the above-mentioned item (12).

(19) A computer readable information recording medium storing therein a program described in the above-mentioned item (13).

(20) A computer readable information recording medium storing therein a program described in the above-mentioned item (17).

(21) The shutoff condition monitoring method as described in the above-mentioned item (1), wherein:

said computer is configured such that:

a BIOS carries out predetermined starting up processing, an operating system starts up, and an application operates on the operating system;

said predetermined shutoff processing comprises processing of shutting off the operating system; and an occurrence of the abnormal shutoff is detected by the BIOS.

(22) The computer as described in the above-mentioned item (7), wherein:

a BIOS carries out predetermined starting up processing, an operating system starts up, and an application operates on the operating system;

said predetermined shutoff processing comprises processing of shutting off the operating system; and an occurrence of the abnormal shutoff is detected by the BIOS.

(23) The program as described in the above-mentioned item (12), applied to the computer which is configured such that:

a BIOS carries out predetermined starting up processing, an operating system starts up, and an application operates on the operating system;

said predetermined shutoff processing comprises processing of shutting off the operating system; and an occurrence of the abnormal shutoff is detected by the BIOS.

The present invention is not limited to the above-described embodiments, and variations and modifications may be made without departing from the basic concept of the present invention claimed below.

The present application is based on Japanese Priority Application No. 2005-029553, filed on Feb. 4, 2005, the entire contents of which are hereby incorporated herein by reference.

What is claimed is:

1. A shutoff condition monitoring method for a computer, comprising the steps of:

a) determining, when starting up the computer, whether or not predetermined normal shutoff information is set;

b) when it is determined in said step a) that the predetermined normal shutoff information is set, carrying out the step b1);

b1) resetting the predetermined normal shutoff information and carrying out starting up of the computer;

c) setting the predetermined normal shutoff information when the computer, having starting up, then shuts off normally;

c-1) determining that an abnormal shutoff has occurred when it is determined in said step a) that the normal shutoff information is not set;

c-2) counting the number of times of repetitive occurrences of the abnormal shutoff;

c-3) determining that predetermined trouble removing processing should be carried out on the computer when the number of times of repetitive occurrences of the abnormal shutoff exceeds a predetermined value;

d) increasing a count value of an abnormal shutoff counter when it is determined in said step a) that the normal shutoff information is not set;

e) comparing the count value of the abnormal shutoff counter with the predetermined value; and f) carrying out the predetermined trouble removing processing when the comparing in said step e) determines that the count value of the abnormal shutoff counter exceeds the predetermined value, wherein said predetermined trouble removing processing comprises the steps of;

g) determining whether or not predetermined recovery related information is set; and h) when it is determined in said step g) that the predetermined recovery related information is set, carrying out step i), but when it is determined in said step g) that the predetermined recovery related information is not set, carrying out steps j1) and j2):

i) outputting a fault message;

j1) carrying out predetermined recovery processing; and j2) setting the recovery related information and resetting the abnormal shutoff counter, and said shutoff condition monitoring method further comprises the step of k) resetting the abnormal shutoff counter, the recovery related information and the normal shutoff information, when it is determined in said step a) that the normal shutoff information is set.

2. The shutoff condition monitoring method as claimed in claim 1, wherein said computer is configured such that:

a BIOS carries out predetermined starting up processing, an operating system starts up, and an application operates on the operating system;

said predetermined shutoff processing comprises processing of shutting off the operating system; and an occurrence of the abnormal shutoff is detected by the BIOS.

3. A computer having a function of determining a timing at which predetermined recovery processing should be carried out by monitoring a shutoff condition of the computer, comprising:

a part determining, when starting up the computer, whether or not predetermined normal shutoff information is set;

a part carrying out, when it is determined that the predetermined normal shutoff information is set, resetting the predetermined normal shutoff information, and carrying out starting up of the computer;

a part setting the predetermined normal shutoff information when the computer, having started up, then shuts off normally;

a part determining that an abnormal shutoff has occurred when it is determined that the normal shutoff is not set;

a part counting the number of times of repetitive occurrences of the abnormal shutoff;

a part determining that predetermined trouble removing processing should be carried out on the computer when the number of times of repetitive occurrences of the abnormal shutoff exceeds a predetermined value;

a part increasing a count value of an abnormal shutoff counter when it is determined that the normal shutoff information is not set;

a part comparing the count value of the abnormal shutoff counter with the predetermined value; and a part carrying out the predetermined trouble removing processing when the count value of the abnormal shutoff counter exceeds the predetermined value, wherein said part carrying out the predetermined trouble removing processing comprises:

a part determining whether or not predetermined recovery related information is set; and a part outputting a fault message when said determining part determines that the predetermined recovery related information is set, but carrying out predetermined recovery processing, setting the recovery related information and resetting the abnormal shutoff counter when said determining part determines that the predetermined recovery related information is not set, and said computer further comprises a part resetting the abnormal shutoff counter, the recovery related information and the normal shutoff information, when it is determined, upon starting up the computer, that the normal shutoff information is set.

* * * * *